United States Patent
Jennings et al.

(10) Patent No.: US 10,890,074 B2
(45) Date of Patent: Jan. 12, 2021

(54) CORIOLIS OPTIMIZED U-CHANNEL WITH PLATFORM CORE

(71) Applicant: United Technologies Corporation, Farmington, CT (US)

(72) Inventors: Timothy J. Jennings, West Hartford, CT (US); Carey Clum, East Hartford, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 218 days.

(21) Appl. No.: 15/968,043

(22) Filed: May 1, 2018

(65) Prior Publication Data
US 2019/0338647 A1  Nov. 7, 2019

(51) Int. Cl.
F01D 5/18 (2006.01)

(52) U.S. Cl.
CPC .......... *F01D 5/187* (2013.01); *F05D 2220/32* (2013.01); *F05D 2240/81* (2013.01); *F05D 2260/202* (2013.01)

(58) Field of Classification Search
CPC . F01D 5/147; F01D 5/18; F01D 5/187; F01D 5/188; F01D 25/12; F05D 2240/81
See application file for complete search history.

(56) References Cited

U.S. PATENT DOCUMENTS

| | | | |
|---|---|---|---|
| 5,813,835 A | 9/1998 | Corsmeier et al. | |
| 6,402,471 B1 * | 6/2002 | Demers | F01D 5/081 |
| | | | 415/115 |
| 6,974,308 B2 * | 12/2005 | Halfmann | B22C 9/04 |
| | | | 415/115 |
| 7,296,973 B2 * | 11/2007 | Lee | F01D 5/187 |
| | | | 416/97 R |
| 7,416,391 B2 | 8/2008 | Veltre et al. | |

(Continued)

FOREIGN PATENT DOCUMENTS

| | | |
|---|---|---|
| EP | 1205634 | 5/2002 |
| EP | 1826360 | 8/2007 |
| WO | 2014052538 | 4/2014 |

OTHER PUBLICATIONS

The Extended European Search Report for EP Application No. 19171843.6, dated Nov. 7, 2019.

*Primary Examiner* — Nathaniel E Wiehe
*Assistant Examiner* — Jackson N Gillenwaters
(74) *Attorney, Agent, or Firm* — Carlson, Gaskey & Olds, P.C.

(57) ABSTRACT

A gas turbine engine component includes an airfoil that has pressure and suction side walls that extend in a chord-wise direction between a leading edge and a trailing edge. The pressure and suction side walls extend in a radial direction between a platform and a tip to provide an exterior airfoil surface. A cooling passage is arranged between the pressure and suction side walls and has a first passage along the pressure side wall and a second passage along the suction side wall. The first passage is configured to receive cooling air from a cooling air source. The second passage is configured to receive cooling air from the first passage near the tip. A platform passage is arranged in the platform and is configured to purge the cooling air from the second passage near the trailing edge.

21 Claims, 6 Drawing Sheets

(56) References Cited

U.S. PATENT DOCUMENTS

| | | | |
|---|---|---|---|
| 8,523,527 B2* | 9/2013 | Lacy | F01D 5/187 |
| | | | 416/193 A |
| 8,540,486 B2* | 9/2013 | Johnson | F01D 5/181 |
| | | | 416/96 R |
| 9,021,816 B2* | 5/2015 | Bergman | F01D 9/02 |
| | | | 415/115 |
| 9,194,237 B2* | 11/2015 | Dillard | F01D 5/187 |
| 10,323,520 B2* | 6/2019 | Perry, II | F01D 5/085 |
| 10,376,950 B2* | 8/2019 | Takamura | B22D 25/02 |
| 2015/0252673 A1 | 9/2015 | VanTassel et al. | |
| 2016/0305254 A1* | 10/2016 | Snyder | F01D 11/006 |

\* cited by examiner

CORIOLIS OPTIMIZED U-CHANNEL WITH PLATFORM CORE

BACKGROUND

This disclosure relates to gas turbine engines and particularly to internally cooled rotor blades.

A gas turbine engine typically includes a fan section, a compressor section, a combustor section, and a turbine section. Air entering the compressor section is compressed and delivered into the combustion section where it is mixed with fuel and ignited to generate a high-temperature and pressure gas flow. The hot gas flow expands through the turbine section to drive the compressor and the fan section.

As is well known, the aircraft engine industry is experiencing a significant effort to improve the gas turbine engine's performance while simultaneously decreasing its weight. The ultimate goal has been to attain the optimum thrust-to-weight ratio. One of the primary areas of focus to achieve this goal is the "hot section" of the engine since it is well known that engine's thrust/weight ratio is significantly improved by increasing the temperature of the turbine gases. However, turbine gas temperature is limited by the metal temperature constraints of the engine's components. Significant effort has been made to achieve higher turbine operating temperatures by incorporating technological advances in the internal cooling of the turbine blades.

Serpentine core cooling passages have been used to cool turbine blades. An example serpentine cooling passage is arranged between the leading and trailing edge core cooling passages in a chord-wise direction. Such a configuration typically provides "up" passages arranged near the leading and trailing edges fluidly joined by a "down" passage. In such arrangements, the Coriolis effect may augment the heat transfer coefficient on the pressure side of an up pass and the suction side of a down pass. With a conventional serpentine design, this only allows one hot wall to take advantage of this augmentation.

SUMMARY

In one exemplary embodiment, a gas turbine engine component includes an airfoil that has pressure and suction side walls that extend in a chord-wise direction between a leading edge and a trailing edge. The pressure and suction side walls extend in a radial direction between a platform and a tip to provide an exterior airfoil surface. A cooling passage is arranged between the pressure and suction side walls and has a first passage along the pressure side wall and a second passage along the suction side wall. The first passage is configured to receive cooling air from a cooling air source. The second passage is configured to receive cooling air from the first passage near the tip. A platform passage is arranged in the platform and is configured to purge the cooling air from the second passage near the trailing edge.

In a further embodiment of the above, the platform passage has a serpentine shape.

In a further embodiment of any of the above, the platform passage is arranged on the suction side of the airfoil.

In a further embodiment of any of the above, the platform includes multiple platform passages.

In a further embodiment of any of the above, each of the multiple platform passages is configured to purge cooling air near the trailing edge.

In a further embodiment of any of the above, the platform includes three platform passages.

In a further embodiment of any of the above, a poorman-fed channel is arranged in the platform. The poorman-fed channel is configured to receive cooling air from a cavity radially inward of the platform.

In a further embodiment of any of the above, the poorman-fed channel is arranged in the platform on the suction side and inward of the platform passage.

In a further embodiment of any of the above, a hybrid cavity is arranged on one of the pressure side and the suction side of the airfoil.

In a further embodiment of any of the above, the cooling air source is bleed air from a compressor section of a gas turbine engine.

In one exemplary embodiment, a gas turbine engine includes a combustor section arranged fluidly between compressor and turbine sections. An airfoil has pressure and suction side walls that extend in a chord-wise direction between a leading edge and a trailing edge. The pressure and suction side walls extend in a radial direction between a platform and a tip to provide an exterior airfoil surface. A cooling passage is arranged between the pressure and suction side walls and has a first passage along the pressure side wall and a second passage along the suction side wall. The first passage is configured to receive cooling air from a cooling air source. The second passage is configured to receive cooling air from the first passage near the tip. A platform passage is configured to purge the cooling air from the second passage near the trailing edge.

In a further embodiment of any of the above, the cooling air source is bleed air from the compressor section.

In a further embodiment of any of the above, the platform passage has a serpentine shape.

In a further embodiment of any of the above, the platform passage is arranged on the suction side of the airfoil.

In a further embodiment of any of the above, the platform includes multiple platform passages.

In a further embodiment of any of the above, each of the multiple platform passages is configured to purge cooling air near the trailing edge.

In a further embodiment of any of the above, the first passage has an aspect ratio of less than about two.

In a further embodiment of any of the above, a poorman-fed channel is arranged in the platform. The poorman-fed channel is configured to receive cooling air from a cavity radially inward of the platform.

In a further embodiment of any of the above, the poorman-fed channel is arranged in the platform on the suction side and inward of the platform passage.

In a further embodiment of any of the above, a hybrid cavity is arranged on one of the pressure side and the suction side of the airfoil.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
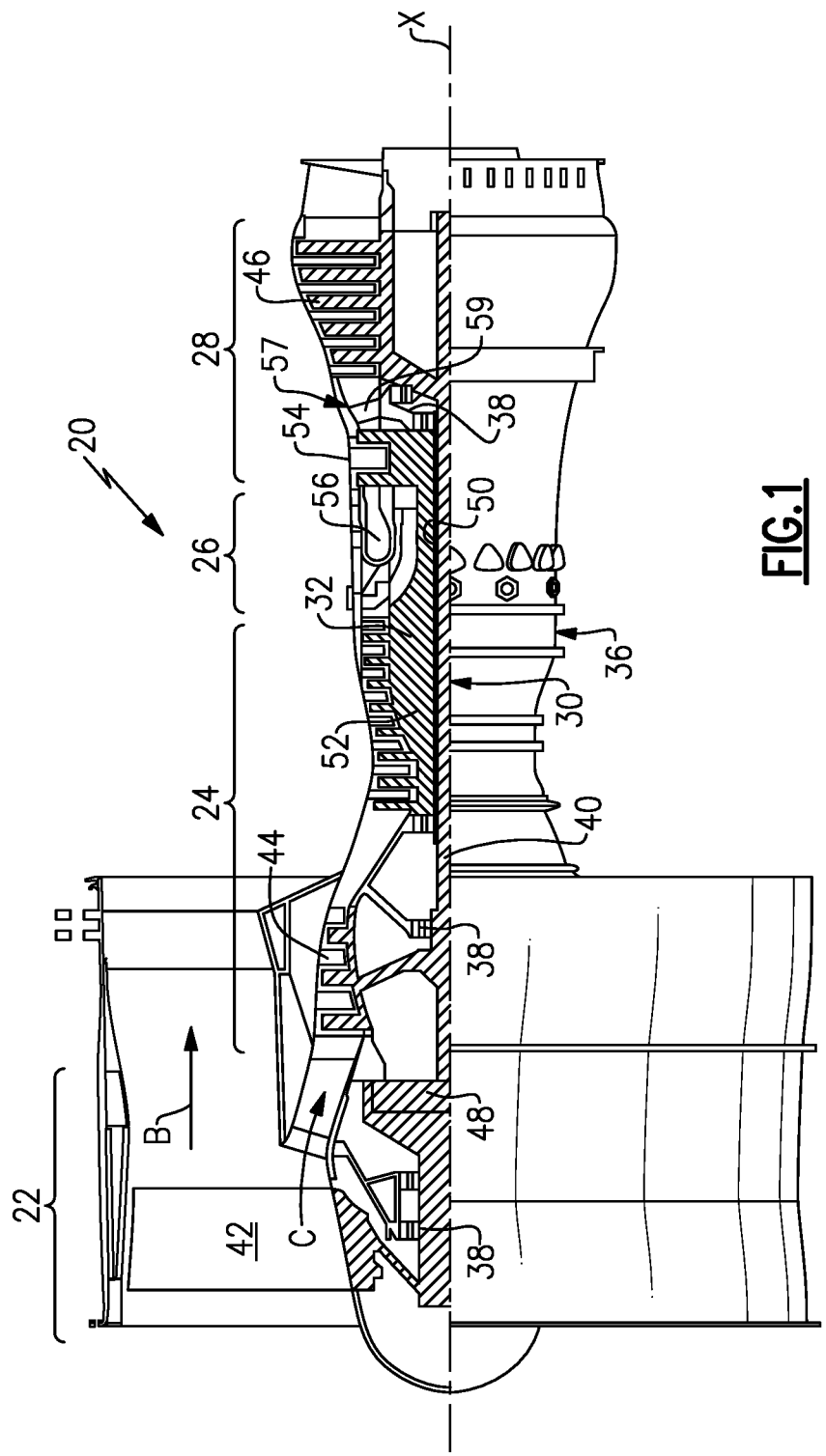
FIG. 1 is a schematic view of an example gas turbine engine according to a first non-limiting example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2A:
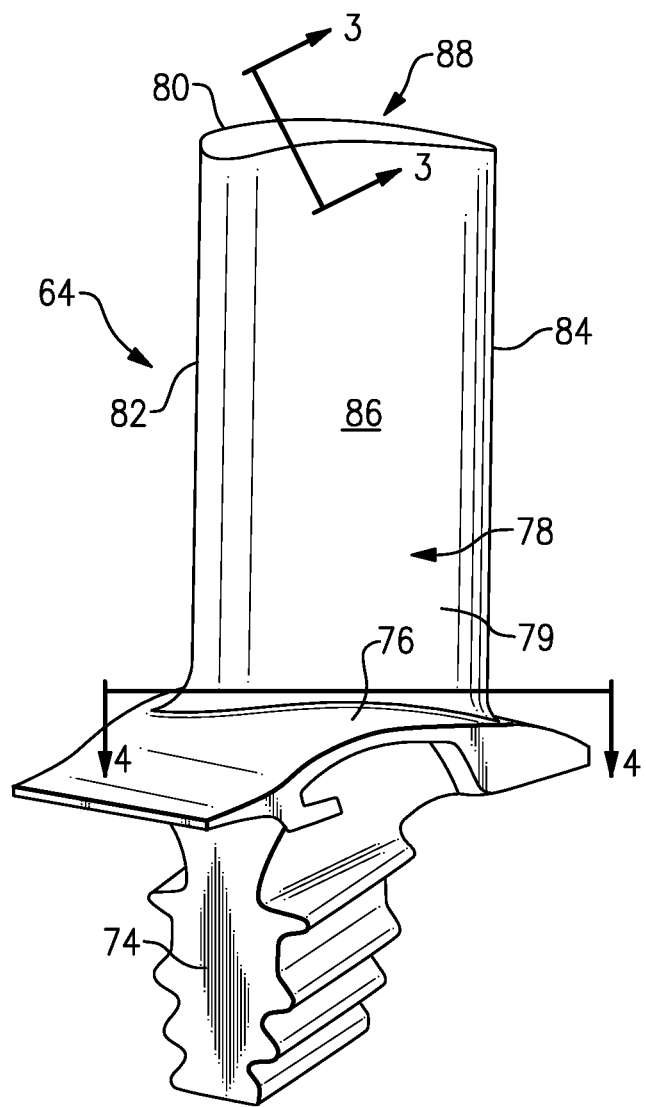
FIG. 2A is a perspective view of an airfoil.

FIG. 2A illustrates an example turbine blade 64. A root 74 of each turbine blade 64 is mounted to a rotor disk. The turbine blade 64 includes a platform 76, which provides the inner flow path, supported by the root 74. An airfoil 78 extends in a radial direction R (shown in FIG. 2B) from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

Figure 2B:
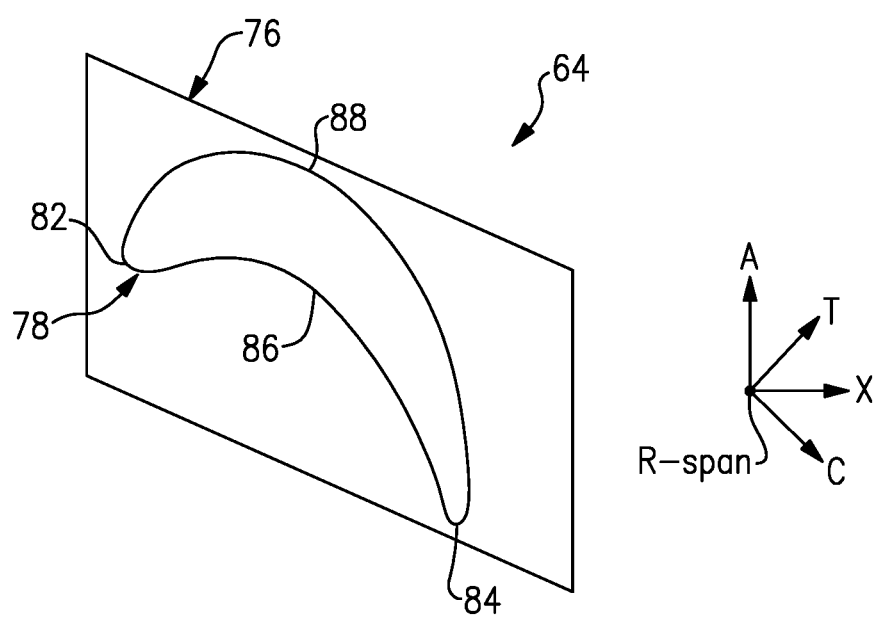
FIG. 2B is a plan view of the airfoil illustrating directional references.

FIGS. 2A and 2B somewhat schematically illustrate an exterior airfoil surface 79 extending in a chord-wise direction C from a leading edge 82 to a trailing edge 84. The airfoil 78 is provided between pressure (typically concave) and suction (typically convex) walls 86, 88 in an airfoil thickness direction T, which is generally perpendicular to the chord-wise direction C. Multiple turbine blades 64 are arranged circumferentially in a circumferential direction A. The airfoil 78 extends from the platform 76 in the radial direction R, or spanwise, to the tip 80.

Figure 3:
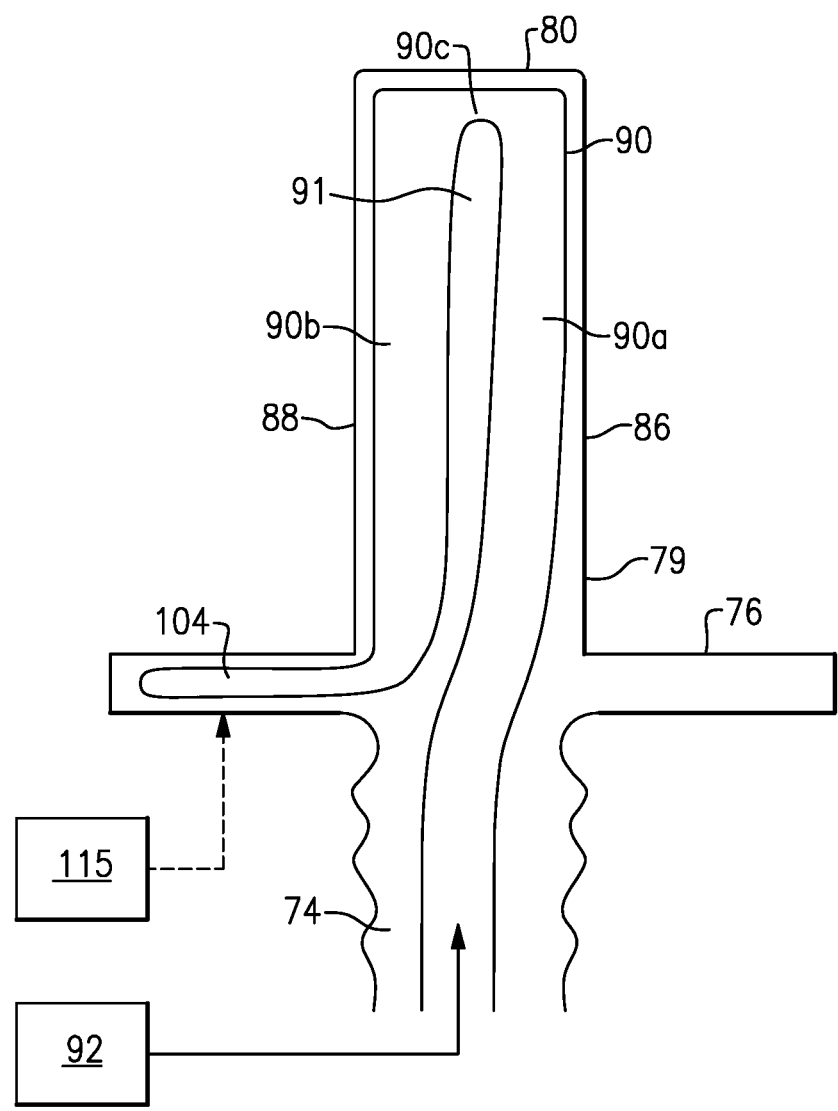
FIG. 3 is a sectional view taken along line 3-3 of FIG. 2A.

FIG. 3 illustrates a cross-sectional view of the airfoil 78. The airfoil 78 has a U-shaped cooling passage 90 arranged at a position in the chord-wise direction C. The cooling passage 90 comprises a first passage 90a arranged on the pressure side 86, and a second passage 90b arranged on the suction side 88. Throughout this disclosure, "up" passages refer to cooling passages that transport cooling fluid radially outward away from the engine centerline, in a direction towards a larger radial outboard location. Conversely, "down" passages, refer to cooling passages that transport cooling fluid radially inward toward the engine centerline, in a direction towards a smaller inboard location. The first passage 90a is an up passage, and is fluidly connected to the second passage 90b, which is a down passage, near the tip 80 at a passage 90c. The first passage 90a receives cooling air from a cooling source 92, such as bleed air from the compressor section 24. The first and second passages 90a, 90b are separated by a rib 91.

The Coriolis effect acts on cooling fluid as it is in motion relative to a rotating component, such as an airfoil. Here, as the turbine blade 64 rotates about the engine central longitudinal axis A, inertia pushes the cooling air against a wall of the blade 64, which enhances the cooling on that wall. In typical cooling passage arrangements, the Coriolis effect augments the heat transfer coefficient on the pressure side of an up pass and the suction side of a down pass. The disclosed U-shaped cooling passage arrangement takes advantage of the Coriolis effect on both the pressure and suction sides 86, 88 of the airfoil 78 as the cooling air moves circumferentially across the airfoil 78. The Coriolis effect improves the heat transfer coefficient on the pressure side 86 as cooling air travels up the first passage 90a and on the suction side 88 as cooling air travels down the second passage 90b.

Figure 4:
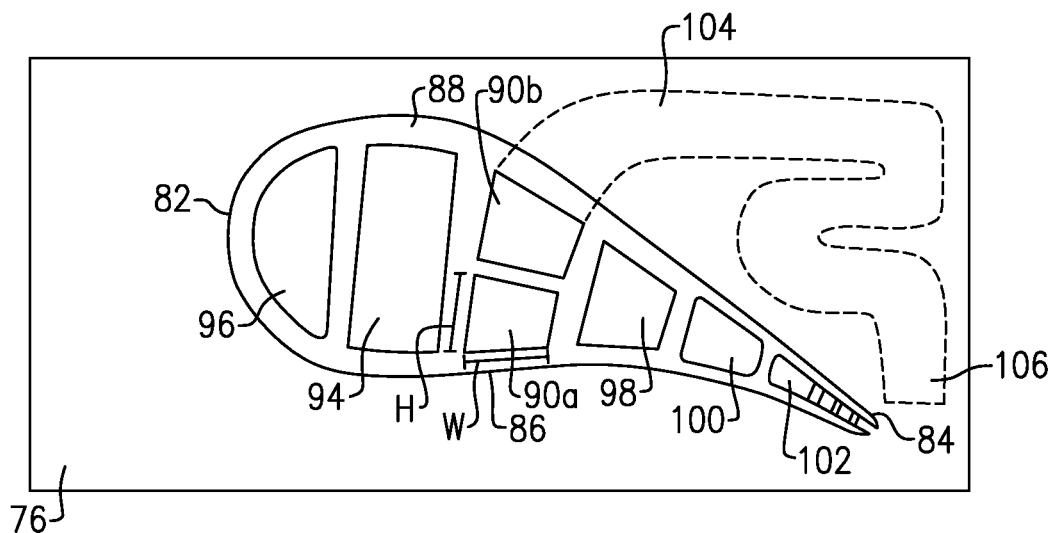
FIG. 4 is a sectional view taken along line 4-4 of FIG. 2A.

Referring now to FIG. 4, the airfoil 78 may include additional cooling passages 94, 96, 98, 100, 102. The location of the U-shaped passage 90 within the airfoil 78 is selected such that the thickness of the airfoil 78 can accommodate both the first ("up") passage 90a and the second ("down") passage 90b at the same position in the chord-wise direction C.

The second passage 90b is fluidly connected to a platform core passage 104. Cooling air travels from the cooling source 92, up the first passage 90a to the airfoil tip 80, and down the second passage 90b. The platform core passage 104 is arranged in the platform 76 at the suction side 88 of the airfoil 78. In this embodiment, the platform core passage 104 does not fluidly communicate with the passages 94, 96, 98, 100, 102. The platform core 104 dumps the cooling air from the second passage 90b at a platform core outlet 106 near the airfoil trailing edge 84. In one embodiment, the outlet 106 is aft of the U-shaped passage 90. In a further embodiment, the outlet 106 is aft of the airfoil trailing edge 84. There is typically a low pressure region at the wake region aft of the airfoil trailing edge 84 where the cooling air may be purged.

In the illustrated embodiment, the platform core passage 104 has a serpentine shape through the platform. Features in the platform core passage 104, such as ribs, may guide the flow through the platform 76 to prevent separation. This serpentine shape provides a large surface area for cooling inside the platform 76. The arrangement of purging the cooling air from the airfoil 78 through the platform 76 allows the same cooling air to be used to cool both the airfoil 78 and the platform 76. This reusing of the cooling air in the platform 76 may improve the overall airfoil cooling efficiency.

Figure 5:
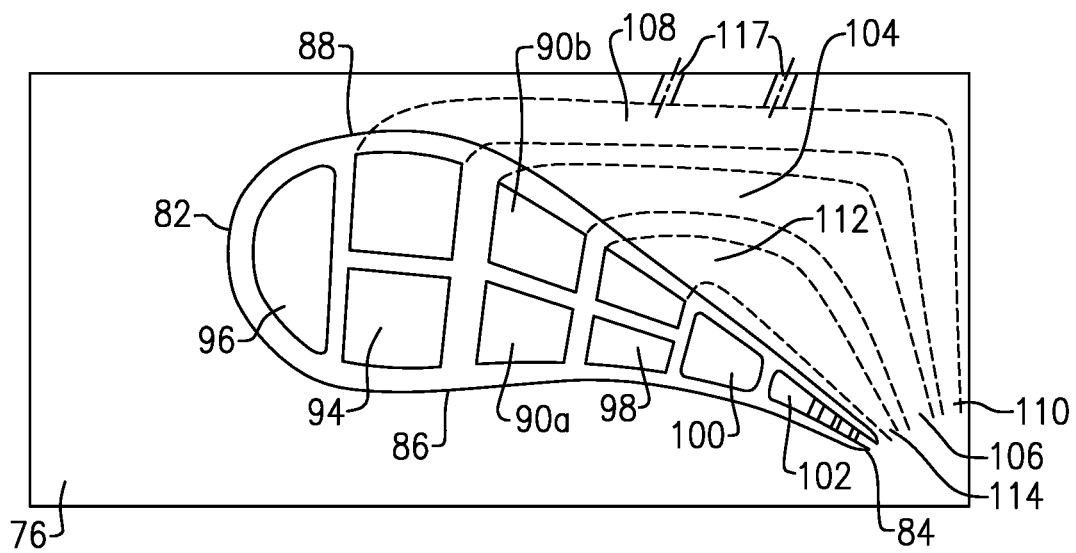
FIG. 5 is another embodiment of the disclosed airfoil

FIG. 5 illustrates another embodiment according to the present invention. In this example, the platform 76 includes multiple platform passages 104, 108, 112. Although three platform core passages are illustrated, a platform with more or fewer platform cores may be contemplated within the scope of this disclosure. Each of the platform core passages 104, 108, 112 is in fluid communication with a cooling passage and purges cooling air at a platform core outlet 106, 110, 114 near the airfoil trailing edge 84. This arrangement with multiple platform core passages provides additional cooling in the platform 76. Additional cooling may be provided by holes 117 which are drilled into the platform passage 104, 108. These holes 117 may provide another location to purge cooling air from the platform 76.

Figure 6:
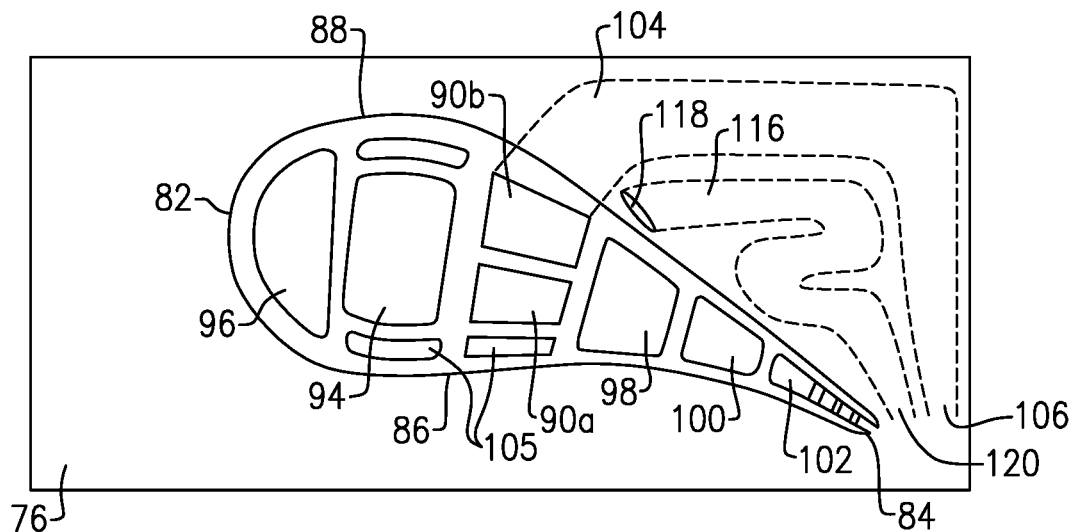
FIG. 6 is another embodiment of the disclosed airfoil.

FIG. 6 illustrates another embodiment according to the present invention. In this embodiment, a poorman-fed channel 116 is arranged in the platform 76. Poorman-fed channels typically rely on hotter air from a different source than the passages in the airfoil 78. The poorman-fed channel 116 receives cooling air from a cavity 115 (shown schematically in FIG. 3) radially inward of the platform 76, and purges the cooling air at an outlet 120 near the airfoil trailing edge 84. In one example, the poorman-fed channel 116 has a serpentine shape. This arrangement ensures the entire platform 76 receives cooling with a less complex circuit design. In the illustrated embodiment, the poorman-fed channel 116 is located circumferentially inward of the platform core passage 104. In other embodiments, the poorman-fed channel 116 may be located circumferentially outward of the platform core passage 104. In further embodiments, the platform 76 may include multiple poorman-fed channels 116.

In some embodiments, the airfoil 78 may also include hybrid cavity passages 105. These hybrid cavity passages 105 along the pressure and/or suction sides 86, 88 may help shield the passage 90 and reduce heat pick up. Hybrid cavity passages 105 extend radially and are provided in a thickness direction T between a cooling passage and the airfoil surface 79 on at least one of the pressure and suction sides 86, 88. In some embodiments, additional hybrid cavity passages may be provided forward or aft of the cooling passage 90. Hybrid cavity passages 105 have a much higher width to height aspect ratio than passage 90. Hybrid cavity passages 105 protect the cooling passage 90 and root flag passage 104 from gaining heat from the core flow path C. Hybrid cavities may be particularly helpful for first stage blades, for example.

Figure 7:
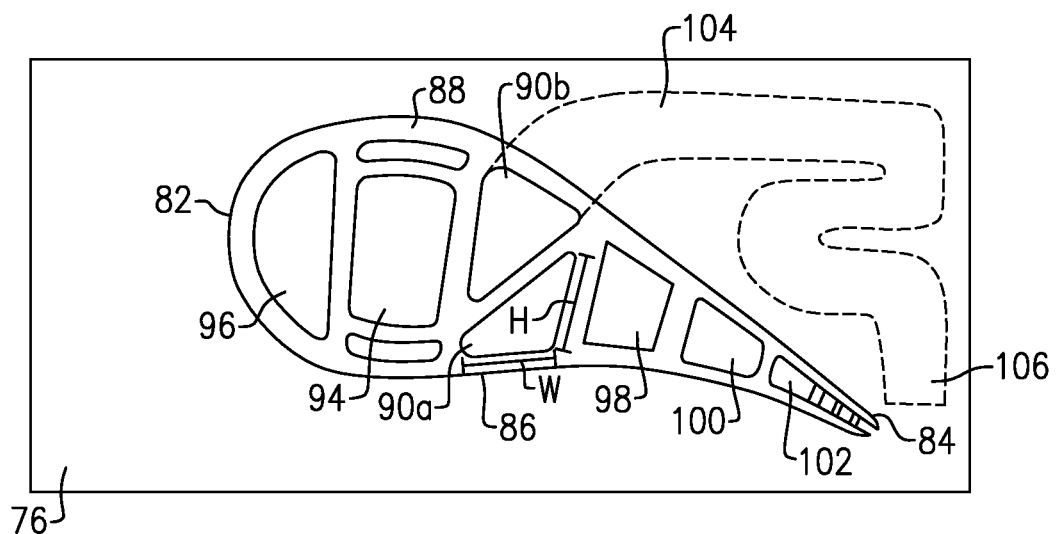
FIG. 7 is another embodiment of the disclosed airfoil.

FIG. 7 illustrates another embodiment according to the present invention. In this example, the first and second passages 90a, 90b have a substantially triangular cross section. In other examples, the first and second passages 90a, 90b have a substantially rectangular cross section. The first and second passages 90a, 90b may have the same cross-sectional shape. The first and second passages 90a, 90b have a width W oriented generally along the chord-wise direction C, and a height H oriented generally along the thickness direction T. In an embodiment, an aspect ratio of the width W to the height H is less than two. The exterior airfoil surface 79 may include film cooling holes in fluid communication with the cooling passage 90 to create a thin film boundary layer that protects the exterior airfoil 78 from hot gases in the core flow path C It should also be understood that although a particular component arrangement is disclosed in the illustrated embodiments, other arrangements will benefit herefrom. Although particular step sequences are shown, described, and claimed, it should be understood that steps may be performed in any order, separated or combined unless otherwise indicated and will still benefit from the embodiments of the present invention. Additionally it is important to note that any complex multi-facetted resupply geometries that bridge centrally located main body cooling passages and peripherally located hybrid skin core cooling cavity passages can be created at any number of radial, circumferential, and/or tangential locations within an internal cooling configuration. The quantity, size, orientation, and location will be dictated by the necessity to increase the local thermal cooling effectiveness and achieve the necessary thermal performance required to mitigate hot section part cooling airflow requirements, as well as, meet part and module level durability life, stage efficiency, module, and overall engine cycle performance and mission weight fuel burn requirements.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine component comprising:
an airfoil having pressure and suction side walls extending in a chord-wise direction between a leading edge and a trailing edge, the pressure and suction side walls extending in a radial direction between a platform and a tip to provide an exterior airfoil surface;
a cooling passage arranged between the pressure and suction side walls having a first passage along the pressure side wall and a second passage along the suction side wall; the first passage configured to receive cooling air from a cooling air source, and the second passage configured to receive cooling air from the first passage near the tip; and
a platform passage arranged in the platform, the platform passage is configured to purge all of the cooling air from the second passage aft of the trailing edge.

2. The component according to claim 1, wherein the platform passage has a serpentine shape.

3. The component according to claim 1, wherein the platform passage is arranged on the suction side of the airfoil.

4. The component according to claim 1, wherein the platform includes multiple platform passages.

5. The component according to claim 4, wherein each of the multiple platform passages is configured to purge cooling air near the trailing edge.

6. The component according to claim 4, wherein the platform includes three platform passages.

7. The component according to claim 1, wherein a poorman-fed channel is arranged in the platform; the poorman-fed channel is configured to receive cooling air from a cavity radially inward of the platform.

8. The component according to claim 7, wherein the poorman-fed channel is arranged in the platform on the suction side and inward of the platform passage.

9. The component according to claim 1, wherein a hybrid cavity is arranged on one of the pressure side and the suction side of the airfoil.

10. The component according to claim 1, wherein the cooling air source is bleed air from a compressor section of a gas turbine engine.

11. The component according to claim 1, wherein the platform passage does not fluidly communicate with other cooling passages in the airfoil.

12. A gas turbine engine comprising:
a combustor section arranged fluidly between compressor and turbine sections; and
an airfoil having pressure and suction side walls extending in a chord-wise direction between a leading edge and a trailing edge, the pressure and suction side walls extending in a radial direction between a platform and a tip to provide an exterior airfoil surface, a cooling passage arranged between the pressure and suction side walls having a first passage along the pressure side wall and a second passage along the suction side wall; the first passage configured to receive cooling air from a cooling air source, and the second passage configured to receive cooling air from the first passage near the tip, and a platform passage configured to purge all of the cooling air from the second passage aft of the trailing edge.

13. The gas turbine engine according to claim 12, wherein the cooling air source is bleed air from the compressor section.

14. The gas turbine engine according to claim 12, wherein the platform passage has a serpentine shape.

15. The gas turbine engine according to claim 12, wherein the platform passage is arranged on the suction side of the airfoil.

16. The gas turbine engine according to claim 12, wherein the platform includes multiple platform passages.

17. The gas turbine engine according to claim 16, wherein each of the multiple platform passages is configured to purge cooling air near the trailing edge.

18. The gas turbine engine according to claim 12, wherein the first passage has an aspect ratio of less than two.

19. The gas turbine engine according to claim 12, wherein a poorman-fed channel is arranged in the platform, the poorman-fed channel is configured to receive cooling air from a cavity radially inward of the platform, the poorman-fed channel is configured to purge the cooling air from the cavity near the trailing edge.

20. The gas turbine engine according to claim 19, wherein the poorman-fed channel is arranged in the platform on the suction side and inward of the platform passage.

21. The gas turbine engine according to claim 12, wherein a hybrid cavity is arranged on one of the pressure side and the suction side of the airfoil.

* * * * *